No. 660,803. Patented Oct. 30, 1900.
F. SCHROTTKE.
MEASURING INSTRUMENT.
(Application filed Feb. 12, 1900.)
(No Model.)
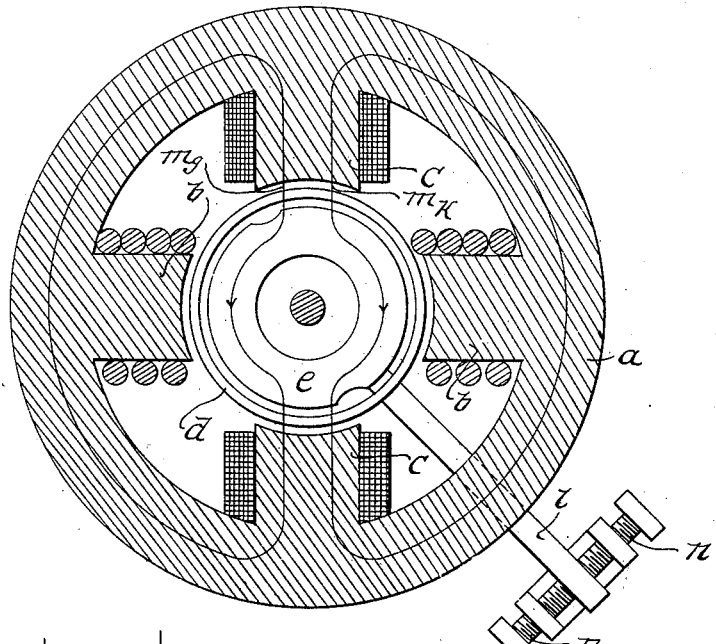
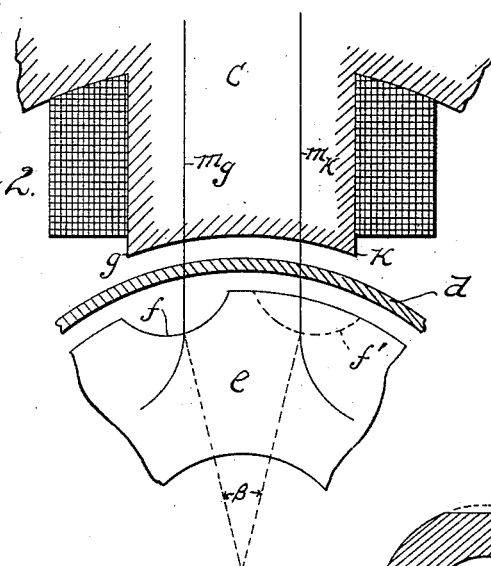
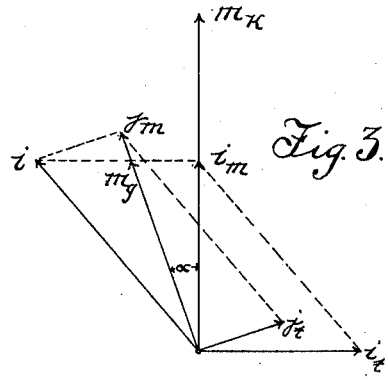
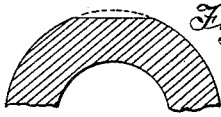 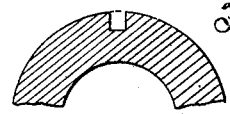
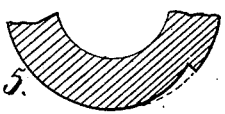 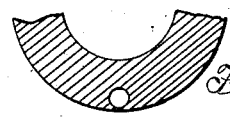
Witnesses:
Max W. Zabel.
C. J. Schmidt.
Inventor:
Franz Schrottke,
By Charles A. Brown & Cragg
Attorneys.
THE NORRIS PETERS CO., PHOTO-LITHO., WASHINGTON, D. C.

UNITED STATES PATENT OFFICE.

FRANZ SCHROTTKE, OF BERLIN, GERMANY, ASSIGNOR TO THE SIEMENS & HALSKE ELECTRIC COMPANY OF AMERICA, OF CHICAGO, ILLINOIS.

MEASURING INSTRUMENT.

SPECIFICATION forming part of Letters Patent No. 660,803, dated October 30, 1900.

Original application filed September 2, 1899, Serial No. 729,324. Divided and this application filed February 12, 1900. Serial No. 4,929. (No model.)

*To all whom it may concern:*

Be it known that I, FRANZ SCHROTTKE, a subject of the Emperor of Germany, residing at Berlin, Germany, have invented a certain new and useful Improvement in Measuring Instruments, (Case No. 340,) of which the following is a full, clear, concise, and exact description, reference being had to the accompanying drawings, forming a part of this specification.

My invention relates to measuring instruments for alternating currents operating through the agency of rotating fields, and has for its object the elimination of certain harmful defects due to abnormal driving or retarding forces which are frequently present in instruments of this class and which in the ideal instrument should not be present, the present application being a division of my original application filed September 2, 1899, Serial No. 729,324. These disturbing forces are in a great measure due to friction and bad workmanship and materially detract from the accuracy and sensibility of the instruments. The effects of friction are noticeable in their retarding influence, being much more so where counting-trains are used. The inaccuracy due to these abnormal forces may occur in all instruments of the class described. In all indicating wattmeters of the class mentioned additional and abnormal driving forces may be caused either by the pressure-coil alone or by the current-coil alone, tending in the first case to displace the indicator from its zero position at no load and in the second case to change the constant of the instrument in proportion to the magnitude of the exerted forces. Where interiorly-disposed iron cylinders or bodies are employed, these faults are frequently due to their eccentric mounting. The provision of a method for correcting or compensating for these errors is the object of my present invention.

I will point out my invention in the claims and fully explain the same by reference to the accompanying drawings, illustrating one embodiment of the invention, in which—

Figure 1 is a view of one type of instrument embodying my invention. Fig. 2 is an enlarged view of a part thereof. Fig. 3 is a diagram for demonstrating the electrical principles here involved. Figs. 4, 5, 6, and 7 are views of a number of modifications of my invention.

Like letters of reference refer to like parts in the different figures.

Instruments operating through the agency of rotating fields may be made, for example, as shown in Fig. 1. My invention may be practiced with instruments of this construction and also useful with instruments of other construction.

The outer or stationary part of the instrument shown consists of an iron field-ring $a$, built, preferably, of laminæ of magnetic material, and has four equidistant internal radially-projected pole-pieces $b\,b$ and $c\,c$. A metal drum $d$ is rotatably mounted inside and concentric with the ring $a$ at a short distance from the ends of said pole-pieces. An iron cylinder $e$ is placed inside and concentric with the drum and at a short distance therefrom. A series winding through which the main current flows is placed upon the pole-pieces $b\,b$, and a shunt-winding carrying current which may be displaced ninety degrees from the impressed pressure is placed upon the pole-pieces $c\,c$. If the shunt-winding alone conveys current, then two principal paths for lines of force will be opened through the ring. The centers of these separate paths $M_g\,M_k$ are symmetrically arranged and no forces will be exerted on the drum, providing no abnormal forces exist. They may, however, exist, and to counteract the same by adjusting the reluctance in one or the other of said paths is the object of my invention. If the reluctance in either path be increased, which is preferably done by cutting a groove $f$ of any desired cross-section on the periphery of the inside ring, a force will be exerted on the drum whose strength is dependent upon the relative positions of the groove and the pole-pieces, whereby the error may be corrected. The effect of the adjustment will be more readily understood by reference to Fig. 2, where a section of the outer field-ring, including the pole-piece $c$, is shown in conjunction with the metal drum and the grooved core. If the inner cylinder $e$ be placed so that the groove $f$ covers one-half of the pole-piece opposite the points $g$ $h$, the reluctance in the path of the line $M_g$, threading this grooved portion, is greater than the reluctance of the path of the line $M_k$, threading the unchanged portion of the inner cylinder. The line $M_g$ will therefore be weaker and will induce a lesser current in the drum than the line $M_k$. The total current $i$ of the shunt field-coils, Fig. 3, has two components—the active current $i_t$ and the one at right angles thereto, the wattless current $i_m$. The active current is in phase with and equal to the current which is induced in the drum, while the wattless current creates the shunt-field M. The other shunt-field $M_g$ is less than the shunt-field $M_k$ and will therefore induce the correspondingly small current in the drum. For this reason the active component $j_t$ of the total current $i$ must be less than the active component in the first case. For this reason the wattless component $M_g$ must be larger, and such may only be the case if the active component $j_t$ in the second case is displaced in phase from the active component $i_t$ by an angle $\alpha$. As the two magnetic lines of force $M_g$ and $M_k$ form the sides of an angle $\beta$, the turning forces exerted upon the drum will be proportional to the expression $M_g\,M_k\sin\alpha\,\beta$. The direction of rotation in this case will be clockwise—that is, from the point $g$ to the point $k$—as the lines of force $M_g$ reach their maximum sooner than do the lines of force $M_k$. By rotating the iron cylinder until the groove $f$ is shifted into the position indicated in dotted lines the line of force $M_k$ will be reduced and will precede the line of force $M_g$, thereby changing the direction of the turning moment. The direction of rotation may be gradually reversed and the force of the turning moment gradually varied by the gradual rotary movement of the cylinder $e$. The groove has no appreciable effect in the apparatus shown after being removed from a pole-piece. So long as the groove is not placed underneath the series winding its action is independent of the working circuit. One groove would be sufficient; but by the use of two the effect is doubled. The form of groove may be any desired, several illustrations of the many types being shown in Figs. 4, 5, 6, and 7. To permit of an easy adjustment, I preferably provide an arm $l$, as shown in Fig. 1, which serves to rotatably adjust the cylinder $e$, which adjustment may be secured by the screws $n$ $n$. If the friction in the meter is to be overcome, the grooves $f$ must be placed near the shunt-poles. This should also be done in securing proper reading (zero reading) upon no load. If the constant of meters changes with the change of load, it is necessary to bring the grooves within the sphere of action of the series field, as such effects are always the result of inaccurate action of the series field. Where two adjustments are to be effected with relation to the series and shunt poles, I prefer to shape the poles in the body $e$ as shown in Fig. 5.

It is obvious that changes may readily be made in the method of my invention without departing from its spirit, and I do not therefore desire to be limited to the precise embodiment of the invention particularly described; but,

Having thus described my invention, I claim as new and desire to secure by Letters Patent—

1. The method of correcting errors in alternating-current-measuring instruments, which consists in setting up lines of force by the current that is to be measured, subjecting a movable element of the instrument to said lines of force, and adjusting the reluctance in the magnetic circuit threaded by a portion only of said lines of force, substantially as described.

2. The method of correcting errors in alternating-current-measuring instruments, which consists in setting up lines of force by the current that is to be measured, causing the said lines of force to follow separate paths, subjecting the movable member of the instrument to the lines of force in both paths, and adjusting the reluctance of the magnetic circuit threaded by one set of the lines of force, substantially as described.

3. The method of correcting errors in alternating-current-measuring instruments, which consists in setting up lines of force by the current that is to be measured in a field portion, subjecting a movable member of the instrument to the action of the field, and varying the cross-section of a part only of the field portion to adjust the reluctance of a magnetic circuit threaded by a portion only of the lines of force to effect the desired correction, substantially as described.

4. The method of correcting errors in alternating-current-measuring instruments, which consists in setting up lines of force, causing the said lines of force to follow two paths in a field portion, subjecting a movable member of the instrument to the action of the said field portion, and varying the cross-section of a part of the field portion threaded by one set of lines of force to adjust the reluctance and thereby to effect the desired correction, substantially as described.

In witness whereof I hereunto subscribe my name this 22d day of January, A. D. 1900.

FRANZ SCHROTTKE.

Witnesses:
 WOLDEMAR HAUPT,
 HENRY HASPER.